(12) United States Patent
Ganapathiappan et al.

(10) Patent No.: US 9,720,341 B2
(45) Date of Patent: Aug. 1, 2017

(54) HIGH OPACITY WHITE INKS CONTAINING MICA-BASED MINERALS WITH TITANIA

(71) Applicant: Hewlett-Packard Development Company, L.P., Houston, TX (US)

(72) Inventors: Sivapackia Ganapathiappan, Los Altos, CA (US); Hou T. Ng, Campbell, CA (US); Albert Teishev, Rishon le-zion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/025,838

(22) PCT Filed: Nov. 1, 2013

(86) PCT No.: PCT/US2013/068008
§ 371 (c)(1),
(2) Date: Mar. 29, 2016

(87) PCT Pub. No.: WO2015/065469
PCT Pub. Date: May 7, 2015

(65) Prior Publication Data
US 2016/0246203 A1    Aug. 25, 2016

(51) Int. Cl.
*G03G 9/09* (2006.01)
*G03G 9/12* (2006.01)
*C09D 11/033* (2014.01)
*C09D 11/037* (2014.01)
*C09D 11/10* (2014.01)
*G03G 9/08* (2006.01)

(52) U.S. Cl.
CPC .......... *G03G 9/122* (2013.01); *C09D 11/033* (2013.01); *C09D 11/037* (2013.01); *C09D 11/10* (2013.01); *G03G 9/0804* (2013.01); *G03G 9/0808* (2013.01)

(58) Field of Classification Search
CPC ..... C09D 11/033; C09D 11/037; C09D 11/10; G03G 9/122; G03G 9/0804; G03G 9/0808
See application file for complete search history.

(56) References Cited

U.S. PATENT DOCUMENTS

| 4,457,540 A | 7/1984 | Hohne |
| 4,668,570 A | 5/1987 | Esselborn et al. |

(Continued)

FOREIGN PATENT DOCUMENTS

| EP | 0723997 | 7/1996 |
| EP | 0864621 | 9/1998 |

(Continued)

OTHER PUBLICATIONS

International Search Report and Written Opinion for International Application No. PCT/US2013/068008 dated Aug. 13, 2014, 11 pages.

(Continued)

*Primary Examiner* — Peter Vajda
(74) *Attorney, Agent, or Firm* — HP Inc. Patent Department

(57) ABSTRACT

A high opacity white ink containing a mica-based mineral with titania is provided. A method of manufacturing the high opacity white ink is also provided.

15 Claims, 1 Drawing Sheet

(56) References Cited

U.S. PATENT DOCUMENTS

| | | | |
|---|---|---|---|
| 5,733,658 A * | 3/1998 | Schmid | A61Q 1/02 |
| | | | 427/331 |
| 5,873,934 A | 2/1999 | Kunii et al. | |
| 6,558,866 B2 | 5/2003 | Hosoi et al. | |
| 7,183,027 B2 | 2/2007 | Takegawa et al. | |
| 7,452,645 B2 | 11/2008 | Sugiura | |
| 2010/0239871 A1 * | 9/2010 | Scheffer | C09D 5/24 |
| | | | 428/447 |
| 2011/0104441 A1 | 5/2011 | Bhattacharyya | |
| 2011/0130510 A1 * | 6/2011 | Xu | C09C 1/62 |
| | | | 524/560 |
| 2013/0288175 A1 | 10/2013 | Chun et al. | |

FOREIGN PATENT DOCUMENTS

| | | |
|---|---|---|
| EP | 1657072 | 5/2006 |
| GB | 1237164 | 6/1971 |
| JP | 2013-060569 | 4/2013 |
| KR | 20040110676 | 12/2004 |
| WO | WO-2011/051122 | 5/2011 |
| WO | WO-2014/120119 | 8/2014 |

OTHER PUBLICATIONS

The Extended European Search Report for International Application No. PCT/US2013/068008 dated Oct. 19, 2016, 8 pages.

* cited by examiner

HIGH OPACITY WHITE INKS CONTAINING MICA-BASED MINERALS WITH TITANIA

BACKGROUND

Digital printing involves technologies in which a printed image is created directly from digital data, for example using electronic layout and/or desktop publishing programs. Some known methods of digital printing include full-color ink-jet, electrophotographic printing, laser photo printing, and thermal transfer printing methods.

Electrophotographic (EP) printing techniques involve the formation of a latent image on a photoconductor surface mounted on an imaging plate. In some examples, the photoconductor is first sensitized to light, usually by charging with a corona discharge, and then exposed to light projected through a positive film of the document to be reproduced, resulting in dissipation of the charge in the areas exposed to light. The latent image is subsequently developed into a full image by the attraction of oppositely charged toner particles to the charge remaining on the unexposed areas. The developed image is transferred from the photoconductor to a rubber offset blanket, from which it is transferred to a substrate, such as paper, plastic or other suitable material, by heat or pressure or a combination of both to produce the printed final image.

The latent image is developed using either a dry toner (a colorant mixed with a powder carrier) or a liquid ink (a suspension of a colorant in a liquid carrier). The toner or ink generally adheres to the substrate surface with little penetration into the substrate. The quality of the final image is largely related to the size of the particles, with higher resolution provided by smaller particles.

Dry toners used in solid electrophotography are fine powders with a relatively narrow particle size distribution that are expelled from fine apertures in an application device. Liquid inks used in liquid electrophotography are generally comprised of pigment- or dye-based thermoplastic resin particles suspended in a non-conducting liquid carrier, generally a saturated hydrocarbon.

HP ElectroInk is a unique liquid ink (Liquid EP) that combines the advantages of electronic printing with the qualities of liquid ink. HP ElectroInk contains charged pigmented particles in a liquid carrier. Like other digital printing technologies, i.e. Dry EP (or xerography), HP ElectroInk enables digital printing by electrically controlling the location of the print particles. However, unlike Dry EP, HP ElectroInk enables very small particle size, down to 1 to 2 μm. HP ElectroInk is supplied as a concentrated paste that is loaded into the press in tubular cartridges in a "clean hands" operation. Inside the press, it is fed into ink supply tanks and diluted with an oil, to form a fluid mixture of carrier liquid and colorant particles ready for printing.

DETAILED DESCRIPTION

Figure 1:
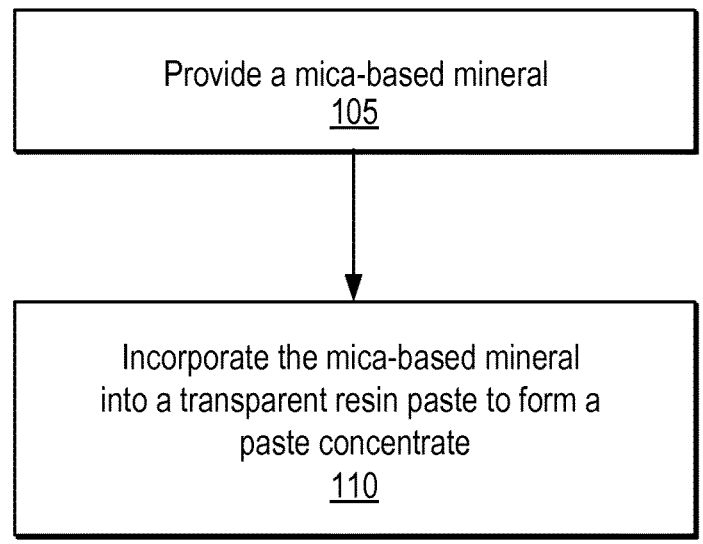
FIG. 1 is a flow chart depicting a method in accordance with examples of the present disclosure.

In the following description, numerous details are set forth to provide an understanding of the examples disclosed herein. However, it will be understood that the examples may be practiced without these details. While a limited number of examples have been disclosed, it should be understood that there are numerous modifications and variations therefrom. Similar or equal elements in the Figures may be indicated using the same numeral.

It is noted that, as used in this specification and the appended claims, the singular forms "a," "an," and "the" include plural referents unless the context clearly dictates otherwise.

As used herein, "carrier fluid", "carrier liquid", or "liquid vehicle" refers to the fluid in which the pigmented resin material of the present disclosure can be dispersed to form an ink dispersion. Such a carrier liquid can be formulated for electrophotographic printing so that the electrophotographic ink has a viscosity and conductivity for such printing, and may include a mixture of a variety of different agents, including without limitation, surfactants, organic solvents and co-solvents, charge control agents, viscosity modifiers, sequestering agents, and stabilizing agents. Though not part of the electrophotographic liquid vehicle per se, in addition to the pigment and resin, the liquid vehicle can further carry solid additives such as resins, latexes, UV curable materials, plasticizers, salts, charge control agents, etc.

As used herein, "co-solvent" refers to any solvent, including organic solvents, present in the electrophotographic liquid vehicle.

As used herein, "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used herein, the term "about" is used to provide flexibility to a numerical range endpoint by providing that a given value may be "a little above" or "a little below" the endpoint, and may be related to manufacturing tolerances. The degree of flexibility of this term can be dictated by the particular variable and would be within the knowledge of those skilled in the art to determine based on experience and the associated description herein. In some examples, "about" may refer to a difference of ±10%.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1 to 3, from 2 to 4, and from 3 to 5, etc. This same principle applies to ranges reciting only one numerical value. Furthermore, such an interpretation should apply regardless of the breadth of the range or the characteristics being described.

Liquid electrophotographic (LEP) inks currently used in digital printing presses typically employ a pigment in a carrier, usually a hydrocarbon-based carrier, such as an isoparaffinic liquid (ISOPAR®, a series of isoparaffinic liquids available from Exxon Chemicals, Houston, Tex., is an example of a suitable carrier). The LEP inks may often include a resin, as well as other ink components for adjusting various desirable properties. The resin holds the pigment on the print media. Other ink components may include a charge director and a silicone additive to help transfer the ink from a blanket to the print media and to extend the life of the blanket.

HP CMYK (cyan, magenta, yellow, black) Indigo ElectroInks constitute the main process color inks for the LEP printing technology, while orange, violet, green, white, transparent, and silver-like ElectroInks are used in specialty printing applications. The demand for white LEP ink may increase considerably due to the anticipated need for digital packaging applications. Current white LEP inks employ primarily titanium dioxide-(titania-; $TiO_2$-)based pigments. They may be costly from a production standpoint and may require a larger amount of titania loading to achieve the desired opacity of at least 40%.

In accordance with the teachings herein, high opacity white inks based on mica-based minerals with titania are provided. By white inks having "high opacity" is meant an ink having an opacity of at least 40%. An opacity of less than 40% is not opaque enough to cover a black image on the print media. An opacity of 45% may be an improvement. An opacity of 50% may find use in many examples. An opacity of 60% or more may be considered to be "super white". Such opacities may be achieved in accordance with the teachings herein, depending on a variety of factors, including the type of mica and the ratio of the mica-titania used.

While natural mica minerals coated with titania may be used in the practice of the teachings herein, titania-coated synthetic mica, which has flat morphologies and is substantially free of impurities, such as iron oxides, may provide the whitest effect pigment currently available. Alternatively, Ti may be incorporated in an iron-free mica (magnesium-aluminum-silicate) structure as a dopant ion or a replacement ion, such as for magnesium. In either case, the amount of $TiO_2$ on or in the mica is in the range of about 20 to 40 wt %.

The fabrication of white LEP inks is also described, using mica minerals to potentially reduce final ink cost and achieve the desired opacity.

The mica is often present as flakes, having a thickness ranging from about 100 to 500 nm and length of about 10 to 25 μm. The final lengths of the mica flakes may be reduced to between about 0.2 to 5 μm and then passivated with latex particles before being incorporated into a transparent resin paste. Although passivation is not necessary, it helps to achieve better development of the final white ink particles in LEP process and improve opacity. A high opacity of 75% may be obtained while other similar formulations can achieve an opacity in the range of 40% to 65%.

Commercially-available coated mica-group minerals may be used as the active white pigments. These mica-based minerals may be low cost. Examples of such pigments are available from BASF (Florham Park, N.J.): Gold Exterior 230D30 (denoted "MGM1" in Table I below) Lumina® Exterior Gold 2303D, Glacier™ Frost White 9S130D (denoted "MGM2" in Table I below) and Glacier™ Exterior Frost White S1303D (denoted "MGM3" in Table I below). According to information from BASF, these pigments appear to be synthetic mica coated with titania.

These commercially-available pigments are large flakes from 10 to 25 μm in length. Their sizes have to be reduced to between 0.2 to 5 μm in order to facilitate transfer from the printing press to the transfer blanket and then to the print medium. In this connection, larger sizes may not transfer well. In some examples, the size of the pigment may be about 2 μm. In the size range of about 0.2 to 5 μm, a mixture of pigments with low to high aspect ratios can act as a good medium for light reflection/scattering, and create the desired reflective index difference with their surrounding medium to deliver the desired opacity. Examples of aspect ratios may range from about 100 to 5,000. The targeted size range can be easily achieved by grinding with ceramic milling beads.

Latex particles may be added to passivate the surfaces of these pigments. By "passivation" is meant that the latex coats the surface of the mica. The latex coating may help in low background development since the conductive mica surface is somewhat suppressed. The passivation also may help in reflectivity by forming a smooth surface, which increases scattering of light.

The amount of latex may range from about 20 to 100 wt % of the mica. In some examples, the amount of latex may be about 60 wt %. Both commercial and custom-made latex particles may be used. The building blocks of the latex polymer that have shown to passivate these pigments may include any of styrene, butyl acrylate, methyl methacrylate, hexyl acrylate, hexyl methacrylate, 2-ethylhexyl acrylate, 2-ethylhexyl methacrylate, glycidyl methacrylate, methacrylonitrile, acrylic acid, and methacrylic acid and mixtures thereof.

In addition to latex-based resins, other examples of coatings may include polymeric resins such as polyethylene-based resins, polyester-based resins, polyurethane-based resins, and mixtures thereof.

The molecular weight of the latex polymer may be in the range of about 30,000 to 1,000,000 (weight average). By "passivated mica" means mica associated with polymeric resins such as polyethylene-based resins, latex-based resins, polyester-based resins, polyurethane-based resins or their combination of one or more resins.

The mica with titania, or pigment, further coated with latex particles, may be initially mixed in water. The water may be removed at, for example, ambient temperature. Then, the entire mixture (mica coated with titania and latex) may be dispersed in a non-polar solvent such as ISOPAR® L. If latex is not added, the pigment can be ground directly in ISOPAR® L.

In either case, the pigment or pigment passivated with latex is milled with a transparent resin paste, such as HP Indigo transparent resin paste, to form a paste concentrate. The paste concentrate may have a ratio of pigment (or passivated pigment) to resin paste in the range of about 20:80 to 80:20. In some examples, the ratio may be 60:40 by weight. The process described above is illustrated further in the examples below. By "transparent" is meant a transparency in the optical wavelength region (about 300 to 700 nm) of the electromagnetic spectrum of at least about 90%.

As depicted in FIG. 1, a method 100 for manufacturing a high opacity white ink includes:
  providing 105 a mica-based mineral; and
  incorporating 110 the mica-based mineral into a transparent resin paste to form a paste concentrate.

In the method 100, the mica-based mineral may be unpassivated or passivated with polymeric resins, as described above.

Following grinding and mixing with the transparent resin paste, the concentrated ink is ready for packaging and shipping to an operator/printer, where it may be diluted with additional carrier to the appropriate concentration for printing. At this time, charge directors, transfer additives (to aid in the transfer of ink from the blanket to the print media), viscosity modifiers, and the like, may be added. In place of grinding, an alternative shear-applying process, such as microfluidization, may be used.

Generally, the liquid electrophotographic ink can include a carrier fluid such as an aliphatic hydrocarbon including substituted or unsubstituted, linear or branched, aliphatic compounds. Additionally, such hydrocarbons can include aryl substituents. In one example, the aliphatic hydrocarbons can be substantially non-aqueous, i.e. containing less than 0.5 wt % water. In another example, the aliphatic hydrocarbons can be non-aqueous, i.e. containing no water. The aliphatic hydrocarbons can comprise a member selected from the group of paraffins, isoparaffins, oils, and alkanes having from about 6 to about 100 carbon atoms, and mixtures thereof.

Additionally, the aliphatic hydrocarbons, or carrier fluid, can be isoparaffins, such as or equivalent to the ISOPAR® high-purity isoparaffinic solvents with narrow boiling ranges marketed by Exxon Mobil Corporation (Fairfax, Va., USA). Also suitable as an aliphatic solvent or cosolvent, for implementing examples of the present invention are alkanes having from about 6 to about 14 carbon atoms such as solvents sold under the NORPAR® (NORPAR® 12, 13 and 15) trade name available from Exxon Mobil Corporation (Fairfax, Va., USA). Other hydrocarbons for use as an aliphatic solvent, or cosolvent, are sold under the AMSCO® (AMSCO® 460 and OMS) trade name available from American Mineral Spirits Company (New York, N.Y., USA), under the SOLTROL® trade name available from Chevron Phillips Chemical Company LLC (The Woodlands, Tex., USA) and under the SHELLSOL® trade name available from Shell Chemicals Limited (London, UK). Such an aliphatic solvent, or cosolvent, can have desirable properties such as low odor, lack of color, selective solvency, good oxidation stability, low electrical conductivity, low skin irritation, low surface tension, superior spreadability, narrow boiling point range, non-corrosive to metals, low freeze point, high electrical resistivity, low surface tension, low latent heat of vaporization and low photochemical reactivity.

The transparent resin may be any of the polyethylene resins commonly used in LEP inks, such as ethylene acid copolymers and ethylene vinyl acetate copolymers. Examples of such copolymers include, but are not limited to, ethylene acid copolymers; ethylene acrylic acid copolymers; methacrylic acid copolymers; ethylene vinyl acetate copolymers; copolymers of ethylene acrylic acid (60 to 99.9 wt %), acrylic acid, or methacrylic acid (40 to 0.1 wt %) and alkyls (with carbon chain lengths between 1 and 20 carbons, inclusive); esters of methacrylic acid or acrylic acid (0.1 to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g., copolymer of acrylic or methacrylic acid and at least one alkyl ester of acrylic or methacrylic acid where the alkyl is from 1 to about 20 carbon atoms, such as methyl methacrylate (50 wt % to 90 wt %)/methacrylic acid (0 wt % to 20 wt %)/ethylhexylacrylate (10 wt % to 50 wt %)); ethylene-acrylate terpolymers; ethylene-acrylic esters-maleic anhydride (MAH) or glycidyl methacrylate (GMA) terpolymers; low molecular weight ethylene-acrylic acid ionomers (i.e., those having a molecular weight less than 1000 amu), or combinations thereof. In one example, the polymer resin is selected from the NUCREL® or BYNEL® family of polymers (available from DuPont Company, Wilmington, Del., USA, e.g., NUCREL® 403, NUCREL® 407, NUCREL® 609HS, NUCREL® 908HS, NUCREL® 1202HC, NUCREL® 30707, NUCREL® 1214, NUCREL® 903, NUCREL® 3990, NUCREL® 910, NUCREL® 925, NUCREL® 609, NUCREL® 599, NUCREL® 960, NUCREL® RX 76, NUCREL® 2806, BYNEL® 2002, BYNEL® 2014, and BYNEL® 2020), the ACLYN® family of polymers (available from Honeywell International, Inc., Morristown, N.J., USA, e.g., ACLYN® 201, ACLYN® 246, ACLYN® 285, and ACLYN® 295), or the LOTADER® family of polymers (available from Arkema, Inc., King of Prussia, Pa., USA, e.g., LOTADER® 2210, LOTADER® 3430, and LOTADER® 8200).

Generally, the charge director can be a natural charge director (NCD) or a synthetic charge director (SCD). In one example, the charge director can be an NCD containing a mixture of charging components. In another example, the NCD can be at least one of the following: zwitterionic material, such as soya lecithin; basic barium petronate (BBP); calcium petronate; isopropyl amine dodecylbenzene sulfonic acid; etc. In one specific non-limiting example, the NCD can be soya lecithin at 6.6% w/w, BBP at 9.8% w/w, isopropyl amine dodecylbenzene sulfonic acid at 3.6% w/w and about 80% w/w isoparaffin (ISOPAR®-L from Exxon). Additionally, the NCD can be any ionic surfactant and/or electron carrier dissolved material. In one example, the charge director can be a synthetic charge director. The charge director can also include aluminum tristearate, barium stearate, chromium stearate, magnesium octoate, iron naphthenate, zinc naphthenate, and mixtures thereof.

Inks may be prepared having about 2 to 4 wt % of solid content in a hydrocarbon liquid, such as ISOPAR® L. In some examples, the amount of solid is about 2 wt %.

EXAMPLES

Example 1

Coated Mica without Latex Particles (Samples 1a-1d).

Pigment (MGM1, 50 g) and 2 mm yttria beads (855 g) were taken in a ceramic chamber of 750 ml and placed in an attritor S-0. ISOPAR® L (140 g) was added and stirred at 500 RPM and at 20 C for 3 h. The reduction of size to about 1 to 3 μm was achieved under these conditions. A small amount was taken out and mixed with HP Indigo transparent resin to have a pigment to resin ratio of 60:40 by weight. This mixture (Sample 1a, as 2 wt % non-volatile solid content (NVS)) was tested in a Q/m cell (a cell to mimic the processes of the press in a small scale to obtain an image). Paper coupons with white and black background were used. Y values were obtained for these images using Elrepho spectrophotometer and then opacity was calculated to be 75%. Y is a measure of brightness at D65 illumination. Opacity was calculated by dividing Y value of image obtained in the black background to the same in the white background and then multiplying the value by 100. The remaining portion was mixed with HP Indigo transparent resin to have pigment to resin ratio of 35:65 by weight. This mixture was tested with various NVS (2 wt %, 3 wt %, and 4 wt %; Samples 1b-1d). in the Q/M cell using paper coupons with white and black background.

Figure 2:
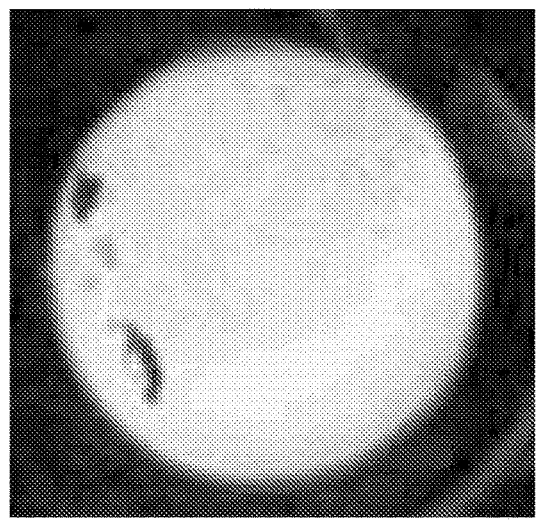
FIG. 2 is a line drawing of a paper coupon with white and black background following testing in a Q/m (charge/mass) cell, according to an example.

FIG. 2 shows an example of a coupon (Sample 1b) developed on the black background from the Q/m cell.

The Y values were obtained for these images using an Elrepho spectrophotometer and the opacity was calculated to be 41%. The details are shown in Table I below. The ratio of mica pigment plays a key role in the opacity as can be seen in Table I; the higher the pigment content (for example comparison between Samples 1a and 1b), the higher the opacity. This compares to that of the 50 wt % of titania pigment which exhibits an opacity of about 61%. It appears that the desired degree of opacity can be obtained with less amount of the MGM pigment.

Other samples 2 to 6 were prepared and tested similar to the Sample 1 above and the opacity values obtained are shown in Table 1.

The opacities obtained for other compositions and with MGM2 pigment are also included in Table I. Based on the opacity values shown in Table 1, opacity can be adjusted by selecting the type of mica and the amount of mica in the ink.

Low-cost pigments which can be milled with lower shear may be used to obtain white LEP inks. The size of the pigments can be reduced easily and latex passivation can be implemented for these pigments to potentially overcome background issues. The present approach has wider materials and process space to achieve desired levels of opacity. It is interesting to note that higher opacity can be obtained with lesser amount of pigment than for titania in the final ink. Indigo titania pigment has 100% titania whereas mica has 20 to 40% of titania in the pigment. This can potentially reduce the final ink layer thickness required to achieve the same level of opacity compared to titania-based inks.

Low-cost pigments which can be milled with lower shear are used to obtain white LEP inks. The size of the pigments

TABLE I

Compositions and Opacity Data.

| Sample | Pigment | Pigment Size (μm) | Pigment Amount (wt %) | Latex (wt %) | Transparent Ink (wt %) | Opacity, % |
|---|---|---|---|---|---|---|
| HP Indigo reference | | | | | | 61 |
| 1a - 2 wt % | Gold Exterior - MGM1 | 1 to 3 | ~60 | 0 | 40 | 75 |
| 1b - 2 wt % | Gold Exterior - MGM1 | 1 to 3 | 35 | 0 | 65 | 41 |
| 1c - 3 wt % | Gold Exterior - MGM1 | 1 to 3 | 35 | 0 | 65 | 46 |
| 1d - 4 wt % | Gold Exterior - MGM1 | 1 to 3 | 35 | 0 | 65 | 56 |
| 2 | Gold Exterior - MGM1 | 1 to 5 | 50 | 25 | 25 | 37 |
| 3 | Frost White 9S130D | 5 to 25 | 50 | 0 | 50 | 39 |
| 4 | Frost White 9S130D | 1 to 15 | 84 | 16 | 0 | 41 |
| 5 | Frost White 9S130D | 3 to 5 | 50 | 25 | 25 | 25 |
| 6 | Frost White 9S130D | 1 to 5 | 50 | 30 | 20 | 30 |
| 7 | Frost White S1303D - MGM3 | 1 to 5 | 50 | 30 | 20 | 40 |

Example 2

Coated Mica with Latex Passivation (Sample 7).

Pigment (MGM3, 10 g) and 2 mm yttria beads (333 g) were taken in a ceramic chamber of 750 ml and placed in in an attritor S-0. Water (120 g) and an in-house latex prepared with the monomer composition styrene/methyl methacrylate/butyl acrylate/methacrylic acid having NVS of 27.75% (21.62 g) was added. The combination was stirred at 400 RPM and at 20° C. for 6 h. Water was removed at ambient temperature. The mixture was taken again in the ceramic chamber and redispersed in ISOPAR® L (45 g) at 200 RPM for 30 min. The dispersion was mixed with HP Indigo transparent resin to form a paste concentrate having a pigment to total resins ratio of 50:50 by weight and stirred at 200 RPM for 30 min. This mixture was tested in the Q/m cell using paper coupons with white and black background similar to Example 1. SEM images were taken of the pigment MGM3, after reducing the size by grinding and after passivation. Y values were obtained for these images and then opacity was calculated to be 40%.

can be reduced easily and latex passivation can be implemented for these pigments to potentially overcome the background issues. The present approach has wider materials and process space to achieve desired levels of opacity. It is interesting to note that higher opacity can be obtained with lesser amount of pigment (than in the titania case) in the final ink. This can potentially reduce the final ink layer thickness required to achieve the same level of opacity compared to titania-based inks.

What is claimed is:

1. A high opacity white ink, comprising:
   a paste concentrate consisting of:
      mica-based mineral coated with titania; and
      a transparent resin paste selected from the group consisting of ethylene acid copolymers and ethylene vinyl acetate copolymers;
      wherein a ratio of the mica-based mineral coated with titania to the transparent resin paste ranges from about 20:80 to 80:20.

2. The high opacity white ink of claim 1, wherein the mica-based mineral coated with titania has a particle size of between 0.2 μm to 5 μm.

3. The high opacity white ink of claim 1, wherein the mica-based mineral coated with titania is passivated with a polymeric resin selected from the group consisting of latex-based resins, polyethylene-based resins, polyester-based resins, polyurethane-based resins, and mixtures thereof.

4. The high opacity white ink of claim 3 wherein the latex-based resins comprise a latex polymer having moieties selected from the group consisting of styrene, butyl acrylate, methyl methacrylate, hexyl acrylate, hexyl methacrylate, 2-ethylhexyl acrylate, 2-ethylhexyl methacrylate, glycidyl methacrylate, methacrylonitrile, acrylic acid, and methacrylic acid, and mixtures thereof.

5. The high opacity white ink of claim 1, further comprising a hydrocarbon-based carrier fluid present in an amount that dilutes the paste concentrate to a concentration for printing.

6. The high opacity white ink of claim 5, wherein the carrier fluid is an isoparaffinic liquid.

7. The high opacity white ink of claim 1, wherein the opacity is at least 40%.

8. A method for manufacturing a high opacity white ink, comprising:
providing a mica-based mineral coated with titania; and
incorporating the mica-based mineral coated with titania into a transparent resin paste to form a paste concentrate consisting of the mica-based mineral coated with titania and the transparent resin paste, the transparent resin paste being selected from the group consisting of ethylene acid copolymers and ethylene vinyl acetate copolymers, and a ratio of the mica-based mineral coated with titania to the transparent resin paste ranging from about 20:80 to 80:20.

9. The method claim 8, wherein the mica-based mineral coated with titania comprises synthetic mica coated with titania.

10. The method of claim 8, wherein prior to the incorporating step, the mica-based mineral coated with titania is passivated with a polymeric resin selected from the group consisting of latex-based resins, polyethylene- based resins, polyester-based resins, polyurethane-based resins, and mixtures thereof.

11. The method of claim 10, wherein the latex-based resins comprise a latex polymer having a moiety selected from the group consisting of styrene, butyl acrylate, methyl methacrylate, hexyl acrylate, hexyl methacrylate, 2-ethylhexyl acrylate, 2-ethylhexyl methacrylate, glycidyl methacrylate, methacrylonitrile, acrylic acid, methacrylic acid, and mixtures thereof.

12. The method of claim 8 further including making the high opacity white ink by admixing a hydrocarbon carrier fluid with the paste concentrate.

13. The method of claim 12, wherein the carrier fluid is an isoparaffinic liquid.

14. The method of claim 8, wherein the mica-based mineral coated with titania has a particle size of about 0.2 μm to 5 μm.

15. The high opacity white ink of claim 1, wherein the ratio of the mica-based mineral coated with titania to the transparent resin paste is 60:40.

* * * * *

UNITED STATES PATENT AND TRADEMARK OFFICE
CERTIFICATE OF CORRECTION

PATENT NO. : 9,720,341 B2
APPLICATION NO. : 15/025838
DATED : August 1, 2017
INVENTOR(S) : Sivapackia Ganapathiappan et al.

Page 1 of 1

It is certified that error appears in the above-identified patent and that said Letters Patent is hereby corrected as shown below:

In the Claims

In Column 8, Line 61, in Claim 1, delete "mica-based" and insert -- a mica-based --, therefor.

In Column 10, Line 4, in Claim 9, delete "method claim" and insert -- method of claim --, therefor.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*